(12) United States Patent
Cho et al.

(10) Patent No.: US 12,218,308 B2
(45) Date of Patent: Feb. 4, 2025

(54) ADDITIVE, ELECTROLYTE FOR RECHARGEABLE LITHIUM BATTERY AND RECHARGEABLE LITHIUM BATTERY

(71) Applicant: SAMSUNG SDI CO., LTD., Yongin-si (KR)

(72) Inventors: Wonseok Cho, Yongin-si (KR); Dahyun Kim, Yongin-si (KR); Minseo Kim, Yongin-si (KR); Sanghyung Kim, Yongin-si (KR); Sanghoon Kim, Yongin-si (KR); Sangwoo Park, Yongin-si (KR); Hyejin Park, Yongin-si (KR); Myungheui Woo, Yongin-si (KR); Bokyung Ryu, Yongin-si (KR); Tae Jin Lee, Yongin-si (KR); Olga Tsay, Yongin-si (KR); Pavel Shatunov, Yongin-si (KR)

(73) Assignee: SAMSUNG SDI CO., LTD., Yongin-si (KR)

( * ) Notice: Subject to any disclaimer, the term of this patent is extended or adjusted under 35 U.S.C. 154(b) by 779 days.

(21) Appl. No.: 17/397,033

(22) Filed: Aug. 9, 2021

(65) Prior Publication Data

US 2022/0069350 A1 Mar. 3, 2022

(30) Foreign Application Priority Data

Aug. 25, 2020 (KR) .................. 10-2020-0107152

(51) Int. Cl.
*H01M 10/0567* (2010.01)
*H01M 4/02* (2006.01)
(Continued)

(52) U.S. Cl.
CPC ....... *H01M 10/0567* (2013.01); *H01M 4/505* (2013.01); *H01M 4/525* (2013.01);
(Continued)

(58) Field of Classification Search
None
See application file for complete search history.

(56) References Cited

U.S. PATENT DOCUMENTS

2006/0172201 A1 8/2006 Yasukawa et al.
2013/0004840 A1 1/2013 Yu et al.

FOREIGN PATENT DOCUMENTS

CN 111217856 A 6/2020
CS 120154 B6 10/1966
(Continued)

OTHER PUBLICATIONS

Chen et al., J. Am. Chem. Soc., 2005, 127, 14473-14478. (Year: 2005).*

(Continued)

*Primary Examiner* — Eli S Mekhlin
(74) *Attorney, Agent, or Firm* — Lee IP Law, P.C.

(57) ABSTRACT

An additive, an electrolyte for a rechargeable lithium battery, and a rechargeable lithium battery including the same, the additive being represented by Chemical Formula 1 or Chemical Formula 2:

[Chemical Formula 1]

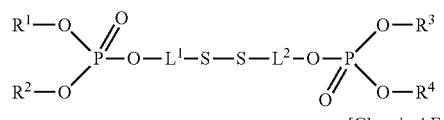

[Chemical Formula 2]

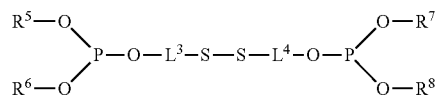

10 Claims, 3 Drawing Sheets

(51) Int. Cl.
*H01M 4/505* (2010.01)
*H01M 4/525* (2010.01)
*H01M 10/0525* (2010.01)
*H01M 10/0568* (2010.01)

(52) U.S. Cl.
CPC ... *H01M 10/0525* (2013.01); *H01M 10/0568* (2013.01); *H01M 2004/028* (2013.01); *H01M 2300/0025* (2013.01)

(56) References Cited

FOREIGN PATENT DOCUMENTS

| | | |
|---|---|---|
| JP | 6235313 B2 | 11/2017 |
| KR | 10-1297172 B1 | 8/2013 |

OTHER PUBLICATIONS

Van Bommel et al., Adv. Funct. Mater., 2001, 11, No. 2, p. 140. (Year: 2001).*

Senda et al., Angew. Chem. Int. Ed., 2015, 54, 4060-4064. (Year: 2015).*

European Search Report dated Jan. 17, 2022.

Shengfu Chen et al., "Strong Resistance of Phosphorylcholine Self-Assembled Monolayers to Protein Adsorption: Insights into Nonfouling Properties of Zwitterionic Materials", J. Am. Chem. Soc., 2005, 127, 14473-14478.

Meng-Hua Xiong, et al., "Bacteria-Responsive Multifunctional Nanogel for Targeted Antibiotic Delivery", Adv. Mater. 2012, 24, 6175-6180.

Yasushi Senda et al., "Cooperative Catalysis: Enantioselective Propargylic Alkylation of Propargylic Alcohols with Enecarbamates Using Ruthenium/ Phosphoramide Hybrid Catalysts", Angewandte Communications, 2015, 54, 4060-4064.

Office Action dated Jan. 19, 2024, (including a Search Report dated Jan. 16, 2024), of the corresponding Chinese Patent Application No. 202110968045.8.

Xiong, Meng-Hua, et al., "Bacteria-Responsive Multifunctional Nanogel for Targeted Antibiotic Delivery". Advanced Materials (Weinheim, Germany) (2012), 24(46), 6175-6180.

Prishchenko et al., Heteroatom Chemistry, vol. 21 (7), 2010.

* cited by examiner

ADDITIVE, ELECTROLYTE FOR RECHARGEABLE LITHIUM BATTERY AND RECHARGEABLE LITHIUM BATTERY

CROSS-REFERENCE TO RELATED APPLICATION

Korean Patent Application No. 10-2020-0107152, filed on Aug. 25, 2020, in the Korean Intellectual Property Office, and entitled: "Additive, Electrolyte for Rechargeable Lithium Battery and Rechargeable Lithium Battery," is incorporated by reference herein in its entirety.

BACKGROUND OF THE INVENTION

1. Field

Embodiments relate to an additive, an electrolyte for a rechargeable lithium battery, and a rechargeable lithium battery.

2. Description of the Related Art

A rechargeable lithium battery may be recharged and has three or more times as high energy density per unit weight as a lead storage battery, nickel-cadmium battery, nickel hydrogen battery, nickel zinc battery, or the like. It may be also charged at a high rate and thus, may be commercially manufactured for a laptop, a cell phone, an electric tool, an electric bike, or the like, and research on improvement of additional energy density have been actively made.

Such a rechargeable lithium battery may be manufactured by injecting an electrolyte into a battery cell, which includes a positive electrode including a positive active material capable of intercalating/deintercalating lithium ions and a negative electrode including a negative active material capable of intercalating/deintercalating lithium ions.

SUMMARY

The embodiments may be realized by providing an additive represented by Chemical Formula 1 or Chemical Formula 2:

[Chemical Formula 1]

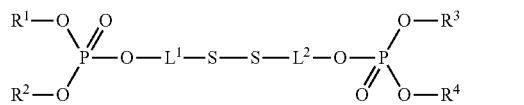

[Chemical Formula 2]

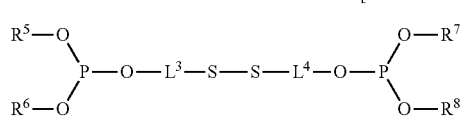

wherein, in Chemical Formula 1 and Chemical Formula 2, $R^1$ to $R^8$ are each independently a substituted or unsubstituted C1 to C10 alkyl group, a substituted or unsubstituted C2 to C10 alkenyl group, a substituted or unsubstituted C3 to C10 cycloalkyl group, a substituted or unsubstituted C3 to C10 cycloalkenyl group, a substituted or unsubstituted C2 to C10 alkynyl group, a substituted or unsubstituted C3 to C10 cycloalkynyl group, or a substituted or unsubstituted C6 to C20 aryl group, $R^1$ to $R^8$ are separately present, or at least one pair of $R^1$ and $R^2$; $R^3$ and $R^4$; $R^5$ and $R^6$; and $R^7$ and $R^8$ are linked to each other to provide a substituted or unsubstituted monocyclic aliphatic heterocycle, a substituted or unsubstituted polycyclic aliphatic heterocycle, a substituted or unsubstituted monocyclic aromatic heterocycle, or a substituted or unsubstituted polycyclic aromatic heterocycle, and $L^1$ to $L^4$ are each independently a substituted or unsubstituted C1 to C20 alkylene group.

The additive may be represented by Chemical Formula 1, Chemical Formula 1 may be represented by Chemical Formula 1A or Chemical Formula 1B:

[Chemical Formula 1A]

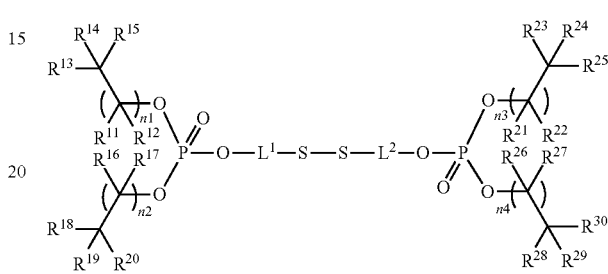

in Chemical Formula 1A, $R^{11}$ to $R^{30}$ may be each independently hydrogen, a halogen, or a substituted or unsubstituted C1 to C10 alkyl group, n1 to n4 may be each independently an integer of 0 to 4, and $L^1$ and $L^2$ may be each independently a substituted or unsubstituted C1 to C20 alkylene group;

[Chemical Formula 1B]

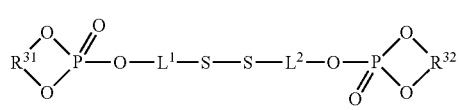

in Chemical Formula 1B, $R^{31}$ and $R^{32}$ may be each independently a substituted or unsubstituted C2 to C10 alkylene group, and $L^1$ and $L^2$ may be each independently a substituted or unsubstituted C1 to C20 alkylene group.

The additive may be represented by Chemical Formula 1B, Chemical Formula 1B may be represented by Chemical Formula 1B-I or Chemical Formula 1B-II:

[Chemical Formula 1B-I]

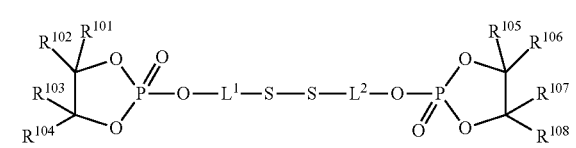

[Chemical Formula 1B-II]

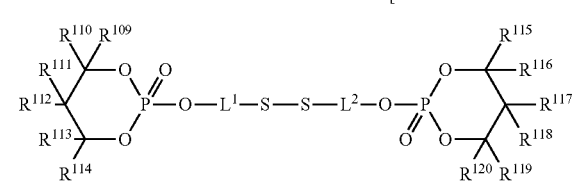

in Chemical Formula 1B-I and Chemical Formula 1B-II, $R^{101}$ to $R^{120}$ may be each independently hydrogen, a halogen, or a substituted or unsubstituted C1 to C10 alkyl group, and $L^1$ and $L^2$ may be each independently a substituted or unsubstituted C1 to C20 alkylene group.

The additive is represented by Chemical Formula 2, Chemical Formula 2 may be represented by Chemical Formula 2A or Chemical Formula 2B:

[Chemical Formula 2A]

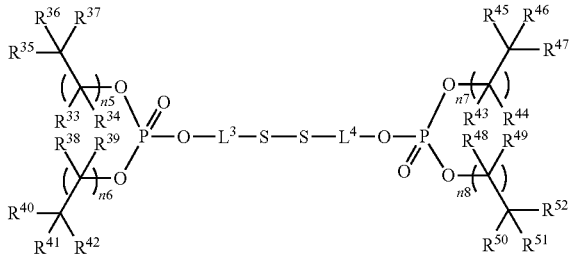

in Chemical Formula 2A, $R^{33}$ to $R^{52}$ may be each independently hydrogen, a halogen, or a substituted or unsubstituted C1 to C10 alkyl group, n5 to n8 may be each independently an integer of 0 to 4, and $L^3$ and $L^4$ may be each independently a substituted or unsubstituted C1 to C20 alkylene group;

[Chemical Formula 2B]

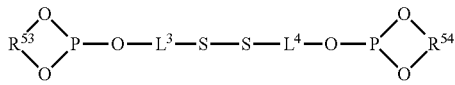

in Chemical Formula 2B, $R^{53}$ and $R^{54}$ may be each independently a substituted or unsubstituted C2 to C10 alkylene group, and $L^3$ and $L^4$ may be each independently a substituted or unsubstituted C1 to C20 alkylene group.

The additive may be represented by Chemical Formula 2B, Chemical Formula 2B may be represented by Chemical Formula 2B-I or Chemical Formula 2B-II:

[Chemical Formula 2B-I]

[Chemical Formula 2B-II]

wherein, in Chemical Formula 2B-I and Chemical Formula 2B-II, $R^{121}$ to $R^{140}$ may be each independently hydrogen, a halogen, or a substituted or unsubstituted C1 to C10 alkyl group, and $L^3$ and $L^4$ may be each independently a substituted or unsubstituted C1 to C20 alkylene group.

The additive may be represented by Chemical Formula 1B-I-1 or Chemical Formula 2B-I-1:

[Chemical Formula 1B-I-1]

[Chemical Formula 2B-I-1]

in Chemical Formula 1B-I-1 and Chemical Formula 2B-I-1, $R^{101}$ to $R^{108}$, $R^{121}$ to and $R^{141}$ to $R^{156}$ may be each independently hydrogen, a halogen, or a substituted or unsubstituted C1 to C10 alkyl group.

The embodiments may be realized by providing an electrolyte for a rechargeable lithium battery, the electrolyte including a non-aqueous organic solvent, a lithium salt, and the additive according to an embodiment.

The additive may be included in an amount of about 0.1 wt % to about 10 wt %, based on a total weight of the electrolyte for a rechargeable lithium battery.

The embodiments may be realized by providing a rechargeable lithium battery including a positive electrode including a positive active material; a negative electrode including a negative active material; and the electrolyte according to an embodiment.

The positive active material may be represented by Chemical Formula 5:

$$Li_xM^1_{1-y-z}M^2_yM^3_zO_2$$ [Chemical Formula 5]

in Chemical Formula 5, 0.5≤x≤1.8, 0≤y≤1, 0≤z≤1, 0≤y+z<1, and $M^1$, $M^2$, and $M^3$ may be each independently Ni, Co, Mn, Al, Sr, Mg, La, or a combination thereof.

The positive active material may be a lithium composite oxide represented by Chemical Formula 5-1, Chemical Formula 5-2, or Chemical Formula 5-3:

$$Li_{x1}Ni_{y1}Co_{z1}Al_{1-y1-z1}O_2$$ [Chemical Formula 5-1]

in Chemical Formula 5-1, 1≤x1≤1.2, 0<y1<1, and 0<z1<1, $$Li_{x2}Ni_{y2}Co_{z2}Mn_{1-y2-z2}O_2$$ [Chemical Formula 5-2]

in Chemical Formula 5-2, 1≤x2≤1.2, 0<y2<1, and 0<z2<1, $$Li_{x3}CoO_2$$ [Chemical Formula 5-3]

in Chemical Formula 5-3, 0.5<x3≤1.

BRIEF DESCRIPTION OF THE DRAWINGS

Features will be apparent to those of skill in the art by describing in detail exemplary embodiments with reference to the attached drawings in which.

DETAILED DESCRIPTION

Figure 1:
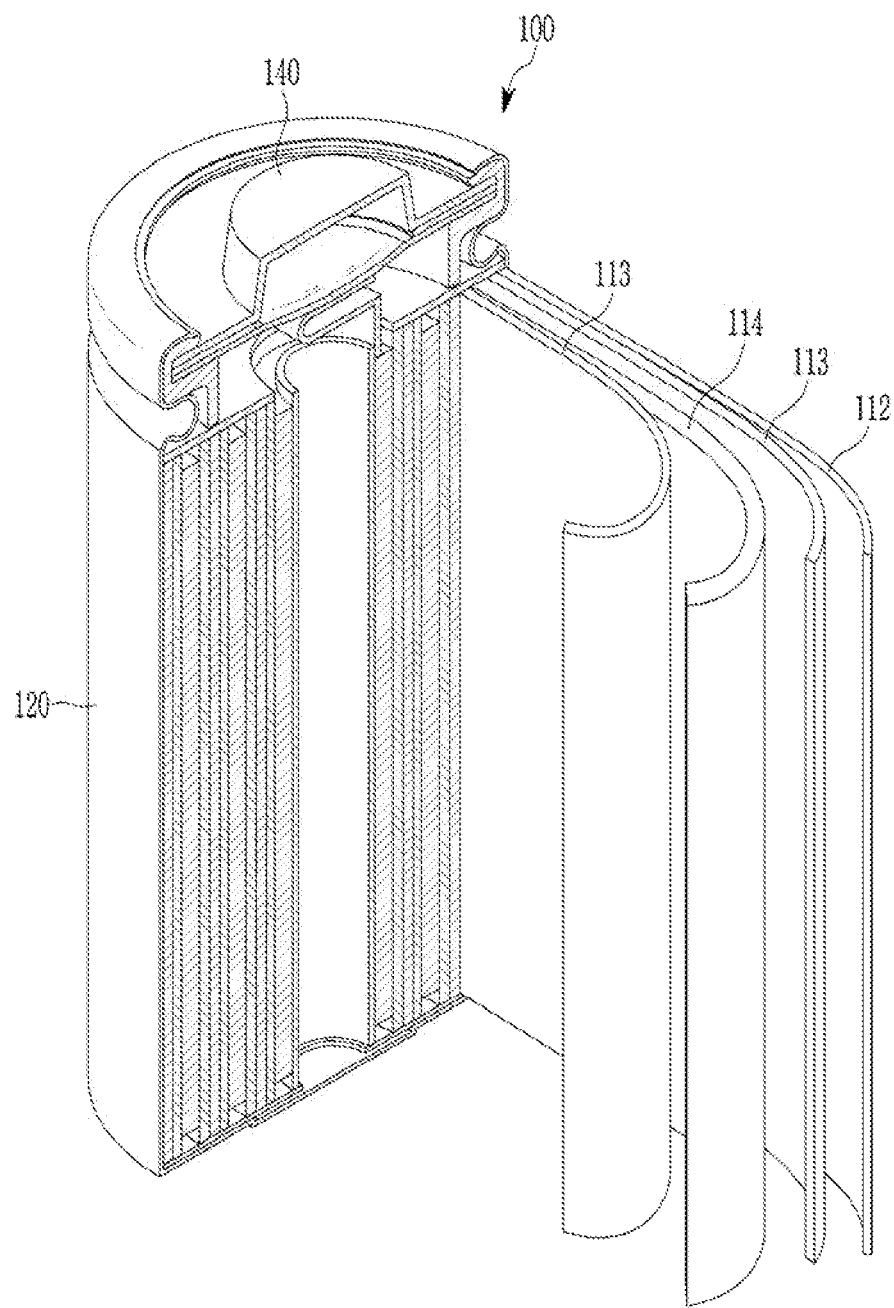
FIG. 1 is an exploded perspective view showing a rechargeable lithium battery according to an embodiment of the present disclosure.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. It will also be understood that when a layer or element is referred to as being "on" another layer or element, it can be directly on the other layer or element, or intervening layers may also be present. In addition, it will also be understood that when a layer is referred to as being "between" two layers, it can be the only layer between the two layers, or one or more intervening layers may also be present. Like reference numerals refer to like elements throughout.

As used herein, when a definition is not otherwise provided, the term "substituted" refers to that a hydrogen atom in a compound is replaced by a substituent other than hydrogen.

In some embodiments, the term "substituted" refers to replacement of a hydrogen atom of a compound by a substituent selected from, for example, a halogen atom (F, Br, Cl, and/or I), a hydroxy group, an alkoxy group, a nitro group, a cyano group, an amino group, an azido group, an amidino group, a hydrazino group, a hydrazono group, a carbonyl group, a carbamyl group, a thiol group, an ester group, a carboxyl group or a salt thereof, a sulfonic acid group or a salt thereof, a phosphoric acid or a salt thereof, a C1 to C20 alkyl group, a C2 to C20 alkenyl group, a C2 to C20 alkynyl group, a C6 to C30 aryl group, a C7 to C30 arylalkyl group, a C1 to C4 alkoxy group, a C1 to C20 heteroalkyl group, a C3 to C20 heteroarylalkyl group, a C3 to C30 cycloalkyl group, a C3 to C15 cycloalkenyl group, a C6 to C15 cycloalkynyl group, a C2 to C20 heterocycloalkyl group, and a combination thereof.

A rechargeable lithium battery may be classified into a lithium ion battery, a lithium ion polymer battery, and a lithium polymer battery depending on kinds of a separator and an electrolyte. It also may be classified to be cylindrical, prismatic, coin-type, pouch-type, and the like depending on shape. In addition, it may be bulk type and thin film type depending on sizes.

Herein, as an example of a rechargeable lithium battery, a cylindrical rechargeable lithium battery is described. FIG. 1 schematically shows the structure of a rechargeable lithium battery according to an embodiment. Referring to FIG. 1, a rechargeable lithium battery 100 according to an embodiment may include a battery cell including a positive electrode 114, a negative electrode 112 facing to the positive electrode 114, and a separator 113 between the positive electrode 114 and the negative electrode 112, an electrolyte impregnating the positive electrode 114, the negative electrode 112 and the separator 113, a battery container 120 housing the battery cell, and a sealing member 140 for sealing the container 120.

Hereinafter, an additive according to an embodiment will be described.

The additive according to an embodiment of the present disclosure may be, e.g., represented by Chemical Formula 1 or Chemical Formula 2.

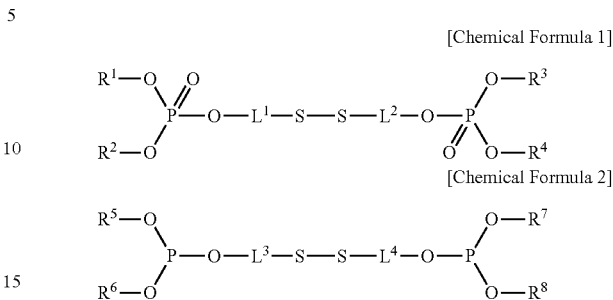

In Chemical Formula 1 and Chemical Formula 2, $R^1$ to $R^8$ may each independently be or include, e.g., a substituted or unsubstituted C1 to C10 alkyl group, a substituted or unsubstituted C2 to C10 alkenyl group, a substituted or unsubstituted C3 to C10 cycloalkyl group, a substituted or unsubstituted C3 to C10 cycloalkenyl group, a substituted or unsubstituted C2 to C10 alkynyl group, a substituted or unsubstituted C3 to C10 cycloalkynyl group, or a substituted or unsubstituted C6 to C20 aryl group. As used herein, the term "or" is not an exclusive term, e.g., "A or B" would include A, B, or A and B.

In an implementation, $R^1$ to $R^8$ may be independently or separately present, or at least one pair of $R^1$ and $R^2$; $R^3$ and $R^4$; $R^5$ and $R^6$; and $R^7$ and $R^8$ may be linked to each other to provide, e.g., a substituted or unsubstituted monocyclic aliphatic heterocycle, a substituted or unsubstituted monocyclic aliphatic heterocycle, a substituted or unsubstituted monocyclic aromatic heterocycle, or a substituted or unsubstituted polycyclic aromatic heterocycle.

$L^1$ to $L^4$ may each independently be or include, e.g., a substituted or unsubstituted C1 to C20 alkylene group.

The additive according to an embodiment of the present disclosure may be a bisphosphate compound or a bisphosphite compound, and may have a structure linked by a disulfide linker.

These bisphosphate compounds and bisphosphite compounds may be decomposed into two phosphate compounds or two phosphite compounds centered on a disulfide linker.

These compounds may form a film on a positive electrode and a negative electrode, and thus an increase in resistance in the film during high temperature storage may be suppressed and film stability may be improved to help enhance high temperature cycle-life and thermal safety characteristics.

In an implementation, the additive may be represented by, e.g., Chemical Formula 1A or Chemical Formula 1B.

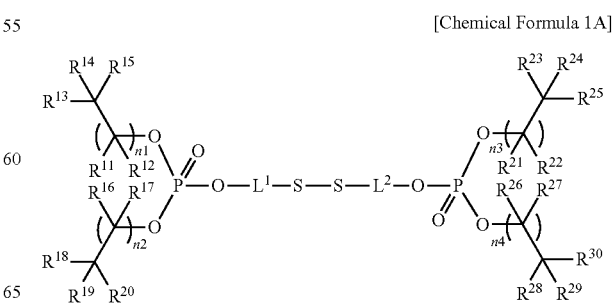

In Chemical Formula 1A, $R^{11}$ to $R^{30}$ may each independently be, e.g., hydrogen, a halogen, or a substituted or unsubstituted C1 to C10 alkyl group.

n1 to n4 may each independently be, e.g., an integer of 0 to 4.

$L^1$ and $L^2$ may each independently be, e.g., a substituted or unsubstituted C1 to C20 alkylene group.

[Chemical Formula 1B]

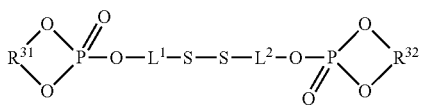

In Chemical Formula 1B, $R^{31}$ and $R^{32}$ may each independently be, e.g., a substituted or unsubstituted C2 to C10 alkylene group.

$L^1$ and $L^2$ may each independently be, e.g., a substituted or unsubstituted C1 to C20 alkylene group.

In an implementation, $R^{11}$ to $R^{30}$ may each independently be, e.g., hydrogen, a halogen, or a substituted or unsubstituted C1 to C5 alkyl group, n1 to n4 may each independently be, e.g., an integer of 0 to 3, and $L^1$ and $L^2$ may each independently be, e.g., a substituted or unsubstituted C2 to C20 alkylene group.

In an implementation, $R^{11}$ to $R^{30}$ may each independently be, e.g., hydrogen, a halogen or a substituted or unsubstituted C1 to C3 alkyl group, n1 to n4 may each independently be, e.g., an integer of 0 to 2, and $L^1$ and $L^2$ may each independently be, e.g., a substituted or unsubstituted C2 to C10 alkylene group.

In an implementation, $R^{31}$ and $R^{32}$ may each independently be, e.g., a substituted or unsubstituted C2 to C5 alkylene group, and $L^1$ and $L^2$ may each independently be, e.g., a substituted or unsubstituted C2 to C20 alkylene group.

In an implementation, $R^{31}$ and $R^{32}$ may each independently be, e.g., a substituted or unsubstituted C2 to C4 alkylene group, and $L^1$ and $L^2$ may each independently be, e.g., a substituted or unsubstituted C2 to C10 alkylene group.

In an implementation, Chemical Formula 1B may be represented by, e.g., Chemical Formula 1B-I or Chemical Formula 1B-II.

[Chemical Formula 1B-I]

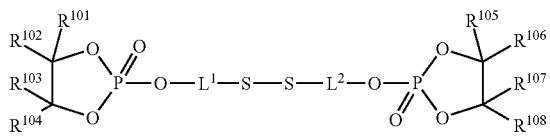

[Chemical Formula 1B-II]

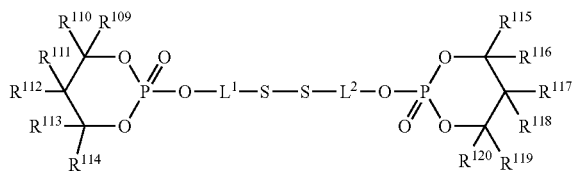

In Chemical Formula 1B-I and Chemical Formula 1B-II, $R^{101}$ to $R^{120}$ may each independently be, e.g., hydrogen, a halogen, or a substituted or unsubstituted C1 to C10 alkyl group.

$L^1$ and $L^2$ may be defined the same as described above.

In an implementation, $R^{101}$ to $R^{120}$ may each independently be, e.g., hydrogen, a halogen, or a substituted or unsubstituted C1 to C5 alkyl group.

In an implementation, $R^{101}$ to $R^{120}$ may each be hydrogen.

In an implementation, the additive may be represented by, e.g., Chemical Formula 2A or Chemical Formula 2B.

[Chemical Formula 2A]

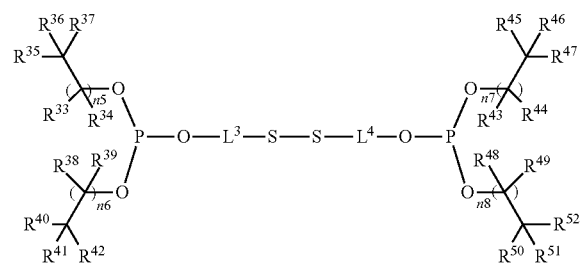

In Chemical Formula 2A, $R^{33}$ to $R^{52}$ may each independently be, e.g., hydrogen, a halogen, or a substituted or unsubstituted C1 to C10 alkyl group.

n5 to n8 may each independently be, e.g., an integer of 0 to 4.

$L^3$ and $L^4$ may each independently be, e.g., a substituted or unsubstituted C1 to C20 alkylene group.

[Chemical Formula 2B]

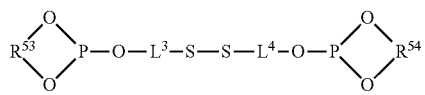

In Chemical Formula 2B, $R^{53}$ and $R^{54}$ may each independently be, e.g., a substituted or unsubstituted C2 to C10 alkylene group.

$L^3$ and $L^4$ may each independently be, e.g., a substituted or unsubstituted C1 to C20 alkylene group.

In an implementation, $R^{33}$ to $R^{52}$ may each independently be, e.g., hydrogen, a halogen, or a substituted or unsubstituted C1 to C5 alkyl group, n5 to n8 may each independently be, e.g., an integer of 0 to 3, and $L^3$ and $L^4$ may each independently be, e.g., a substituted or unsubstituted C2 to C20 alkylene group.

In an implementation, $R^{33}$ to $R^{52}$ may each independently be, e.g., hydrogen, a halogen or a substituted or unsubstituted C1 to C3 alkyl group, n5 to n8 may each independently be, e.g., an integer of 0 to 2, and $L^3$ and $L^4$ may each independently be, e.g., a substituted or unsubstituted C2 to C10 alkylene group.

In an implementation, $R^{53}$ and $R^{54}$ may each independently be, e.g., a substituted or unsubstituted C2 to C5 alkylene group and $L^3$ and $L^4$ may each independently be, e.g., a substituted or unsubstituted C2 to C20 alkylene group.

In an implementation, $R^{53}$ and $R^{54}$ may each independently be, e.g., a substituted or unsubstituted C2 to C4 alkylene group and $L^3$ and $L^4$ may each independently be, e.g., a substituted or unsubstituted C2 to C10 alkylene group.

In an implementation, Chemical Formula 2B may be represented by, e.g., Chemical Formula 2B-I or Chemical Formula 2B-II.

[Chemical Formula 2B-I]

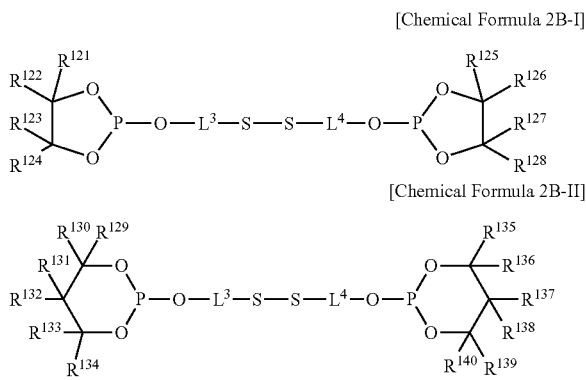

[Chemical Formula 2B-II]

In Chemical Formula 2B-I and Chemical Formula 2B-II, $R^{121}$ to $R^{140}$ may each independently be, e.g., hydrogen, a halogen, or a substituted or unsubstituted C1 to C10 alkyl group.

$L^3$ and $L^4$ may be defined the same as described above.

In an implementation, $R^{121}$ to $R^{140}$ may each independently be, e.g., hydrogen, a halogen, or a substituted or unsubstituted C1 to C5 alkyl group.

In an implementation, $R^{121}$ to $R^{140}$ may each be hydrogen.

In an implementation, the additive may be represented by, e.g., Chemical Formula 1B-I-1 or Chemical Formula 2B-I-1.

[Chemical Formula 1B-I-1]

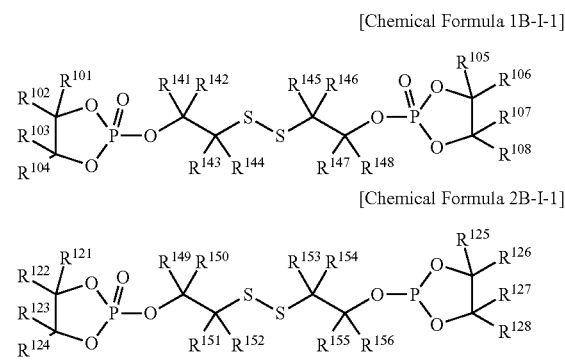

[Chemical Formula 2B-I-1]

In Chemical Formula 1B-I-1 and Chemical Formula 2B-I-1, $R^{101}$ to $R^{108}$, $R^{121}$ to $R^{128}$, and $R^{141}$ to $R^{156}$ may each independently be, e.g., hydrogen, a halogen, or a substituted or unsubstituted C1 to C10 alkyl group.

$L^3$ and $L^4$ may be defined the same as described above.

In an implementation, $R^{101}$ to $R^{108}$, $R^{121}$ to $R^{128}$, and $R^{141}$ to $R^{156}$ may each independently be, e.g., hydrogen, a halogen, or a substituted or unsubstituted C1 to C5 alkyl group.

In an implementation, $R^{101}$ to $R^{108}$, $R^{121}$ to $R^{128}$, and $R^{141}$ to $R^{156}$ may each be hydrogen.

The additive according to an embodiment of the present disclosure may be synthesized by a suitable method, and may be synthesized including a process modified to a degree that can be changed as desired.

In an implementation, a process of treating with a basic substance may be included in the process of synthesizing the additive, and in this case, the basic substance may be used by changing materials usable as a basic substance as well as an amine compound. In an implementation, triethylamine, 1,8-diazabicyclo[5,4,0]undec-7-ene (DBU), imidazole, dimethylaminopyridine, 1,4-diazabicyclo[2.2.2]octane (DABCO), or diethylpropylamine may be used.

The electrolyte for a rechargeable lithium battery according to another embodiment of the present disclosure may include a non-aqueous organic solvent, a lithium salt, and the aforementioned additive.

The additive may be included in an amount of about 0.1 wt % to about 10 wt %, e.g., 0.1 wt % to 5.0 wt %, or 0.1 wt % to 3.0 wt %, based on the total weight of the electrolyte for a rechargeable lithium battery.

When the content range of the additive is as described above, a resistance increase at high temperatures may be prevented, to provide a rechargeable lithium battery with improved cycle-life characteristics.

When the content of the additive is less than about 0.1 wt %, high-temperature storage characteristics may be deteriorated, and when it exceeds about 10 wt %, cycle-life may be decreased due to an increase in interface resistance.

The non-aqueous organic solvent may serve as a medium for transmitting ions taking part in the electrochemical reaction of a battery.

The non-aqueous organic solvent may be a carbonate, ester, ether, ketone, alcohol, or aprotic solvent.

The carbonate solvent may include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), and the like. The ester solvent may include methyl acetate, ethyl acetate, n-propyl acetate, t-butyl acetate, dimethylacetate, methylpropionate, ethylpropionate, propylpropionate, decanolide, mevalonolactone, caprolactone, and the like. The ether solvent may include dibutyl ether, tetraglyme, diglyme, dimethoxyethane, 2-methyltetrahydrofuran, tetrahydrofuran, and the like. In addition, the ketone solvent may include cyclohexanone, and the like. The alcohol solvent may include ethanol, isopropyl alcohol, and the like. The aprotic solvent may include nitriles such as R—CN (wherein R is a hydrocarbon group having a C2 to C20 linear, branched, or cyclic structure and may include a double bond, an aromatic ring, or an ether bond), and the like, dioxolanes such as 1,3-dioxolane, and the like, sulfolanes, and the like.

The non-aqueous organic solvent may be used alone or in a mixture of two or more. When the non-aqueous organic solvent is used in a mixture, the mixture ratio may be controlled in accordance with a desirable battery performance.

In an implementation, the carbonate solvent may be prepared by mixing a cyclic carbonate and a linear carbonate. When the cyclic carbonate and linear carbonate are mixed together in a volume ratio of about 1:1 to about 1:9, an electrolyte performance may be improved.

The non-aqueous organic solvent may further include an aromatic hydrocarbon organic solvent in addition to the carbonate solvent. In an implementation, the carbonate solvent and the aromatic hydrocarbon organic solvent may be mixed in a volume ratio of about 1:1 to about 30:1.

The aromatic hydrocarbon organic solvent may be an aromatic hydrocarbon compound of Chemical Formula 3.

[Chemical Formula 3]

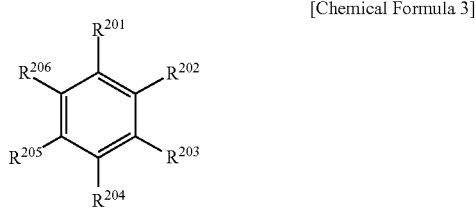

In Chemical Formula 3, $R^{201}$ to $R^{206}$ may each independently be, e.g., hydrogen, a halogen, a C1 to C10 alkyl group, a haloalkyl group, or a combination thereof.

Examples of the aromatic hydrocarbon organic solvent may include benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 2,3-difluorotoluene, 2,4-difluorotoluene, 2,5-difluorotoluene, 2,3,4-trifluorotoluene, 2,3,5-trifluorotoluene, chlorotoluene, 2,3-dichlorotoluene, 2,4-dichlorotoluene, 2,5-dichlorotoluene, 2,3,4-trichlorotoluene, 2,3,5-trichlorotoluene, iodotoluene, 2,3-diiodotoluene, 2,4-diiodotoluene, 2,5-diiodotoluene, 2,3,4-triiodotoluene, 2,3,5-triiodotoluene, xylene, and a combination thereof.

The electrolyte may further include vinylene carbonate or an ethylene carbonate compound represented by Chemical Formula 4 in order to help improve cycle-life of a battery.

[Chemical Formula 4]

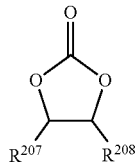

In Chemical Formula 4, $R^{207}$ and $R^{208}$ may each independently be, e.g., hydrogen, a halogen, a cyano group (CN), a nitro group ($NO_2$), or a fluorinated C1 to C5 alkyl group. In an implementation, at least one of $R^{207}$ and $R^{208}$ may be a halogen, a cyano group (CN), a nitro group ($NO_2$), or a fluorinated C1 to C5 alkyl group and $R^{207}$ and $R^{208}$ may not simultaneously be hydrogen.

Examples of the ethylene carbonate compound may include difluoroethylene carbonate, chloroethylene carbonate, dichloroethylene carbonate, bromoethylene carbonate, dibromoethylene carbonate, nitroethylene carbonate, cyanoethylene carbonate, or fluoroethylene carbonate. The amount of the additive for improving cycle-life may be used within an appropriate range.

The lithium salt dissolved in the non-organic solvent may supply lithium ions in a battery, enables a basic operation of a rechargeable lithium battery, and improves transportation of the lithium ions between positive and negative electrodes. Examples of the lithium salt may include $LiPF_6$, $LiBF_4$, LiDFOP, LiDFOB, $LiPO_2F_2$, $LiSbF_6$, $LiAsF_6$, $LiN(SO_2C_2F_5)_2$, $Li(CF_3SO_2)_2N$, $LiN(SO_3C_2F_5)_2$, $Li(FSO_2)_2N$ (lithium bis(fluorosulfonyl)imide: LiFSI), $LiC_4F_9SO_3$, $LiClO_4$, $LiAlO_2$, $LiAlCl_4$, $LiN(C_xF_{2x+1}SO_2)(C_yF_{2y+1}SO_2)$, wherein x and y are natural numbers, e.g., an integer ranging from 1 to 20, LiCl, LiI, and $LiB(C_2O_4)_2$ (lithium bis(oxalato) borate; LiBOB). The lithium salt may be used in a concentration ranging from about 0.1 M to about 2.0 M. When the lithium salt is included at the above concentration range, an electrolyte may have excellent performance and lithium ion mobility due to optimal electrolyte conductivity and viscosity.

Another embodiment of the present disclosure provides a rechargeable lithium battery including a positive electrode including a positive active material; a negative electrode including a negative active material; and the aforementioned electrolyte.

The positive electrode may include a positive current collector and a positive active material layer on the positive current collector, and the positive active material layer includes a positive active material.

The positive active material may include lithiated intercalation compounds that reversibly intercalate and deintercalate lithium ions.

In an implementation, a composite oxide of a metal, e.g., cobalt, manganese, nickel, or a combination thereof, and lithium may be used.

In an implementation, one having a coating layer on the surface of the composite oxide may be used, or a mixture of the composite oxide and a composite oxide having a coating layer may be used. The coating layer may include a coating element compound selected from an oxide of a coating element, a hydroxide of a coating element, an oxyhydroxide of a coating element, an oxycarbonate of a coating element, and a hydroxy carbonate of a coating element. The compound for the coating layer may be amorphous or crystalline. The coating element included in the coating layer may include, e.g., Mg, Al, Co, K, Na, Ca, Si, Ti, V, Sn, Ge, Ga, B, As, Zr, or a mixture thereof. The coating layer may be disposed in a method having no adverse influence on properties of a positive active material by using these elements in the compound. In an implementation, the method may include a suitable coating method (e.g., spray coating, dipping, or the like).

The positive active material may be, e.g., a lithium composite oxide represented by Chemical Formula 5.

$$Li_xM^1_{1-y-z}M^2_yM^3_zO_2 \qquad \text{[Chemical Formula 5]}$$

In Chemical Formula 5,
0.5≤x≤1.8, 0≤y<1, 0≤z<1, 0≤y+z<1, and $M^1$, $M^2$, and $M^3$ may each independently be, e.g., Ni, Co, Mn, Al, Sr, Mg, or La, and a combination thereof.

In an implementation, $M^1$ may be, e.g., Co, Mn, Al, Sr, Mg, or La, and $M^2$ and $M^3$ may each independently be, e.g., Ni or Co.

In an implementation, $M^1$ may be Mn or Al, and $M^2$ and $M^3$ may each independently be Ni or Co.

In an implementation, the positive electrode active material may be a lithium composite oxide represented by at least one of Chemical Formula 5-1 to Chemical Formula 5-3.

$$Li_{x1}Ni_{y1}Co_{z1}Al_{1-y1-z1}O_2 \qquad \text{[Chemical Formula 5-1]}$$

In Chemical Formula 5-1, 1≤x1≤1.2, 0<y1<1, and 0<z1<1.

$$Li_{x2}Ni_{y2}Co_{z2}Mn_{1-y2-z2}O_2 \qquad \text{[Chemical Formula 5-2]}$$

In Chemical Formula 5-2,
1≤x2≤1.2, 0<y2<1, and 0<z2<1.

$$Li_{x3}CoO_2 \qquad \text{[Chemical Formula 5-3]}$$

In Chemical Formula 5-3,
0.5<x3≤1.

In an implementation, in Chemical Formula 5-1, 1≤x1≤1.2, 0.5≤y1<1, and 0<z1≤0.5.

In an implementation, in Chemical Formula 5-2, 1≤x2≤1.2, 0.3≤y2<1, and 0.3≤z2<1.

The positive active material may be included in an amount of about 90 wt % to about 98 wt %, based on the total weight of the positive active material layer.

In an implementation, the positive active material layer may optionally include a conductive material and a binder.

In an implementation, the binder may be included in an amount of about 1 wt % to about 5 wt %, based on the total weight of the positive active material layer.

The conductive material may be included in an amount of about 1 wt % to about 5 wt %, based on the total weight of the positive active material layer.

The conductive material may provide electrode conductivity. A suitable electrically conductive material may be used as a conductive material unless it causes a chemical change. Examples of the conductive material may include a carbon material such as natural graphite, artificial graphite, carbon black, acetylene black, Ketjen black, a carbon fiber, or the like; a metal material of a metal powder or a metal fiber including copper, nickel, aluminum, silver, or the like; a conductive polymer such as a polyphenylene derivative; or a mixture thereof.

The binder may help improve binding properties of positive active material particles with one another and with a current collector. Examples thereof may include polyvinyl alcohol, carboxylmethyl cellulose, hydroxypropyl cellulose, diacetyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, or the like.

The positive current collector may use, e.g., Al.

The negative electrode includes a negative current collector and a negative active material layer including a negative active material and disposed on the negative current collector.

The negative active material may include a material that reversibly intercalates/deintercalates lithium ions, a lithium metal, a lithium metal alloy, a material being capable of doping/dedoping lithium, or transition metal oxide.

The material that reversibly intercalates/deintercalates lithium ions may include a carbon material. The carbon material may be a suitable carbon negative active material for a rechargeable lithium battery. Examples thereof may include crystalline carbon, amorphous carbon, or a mixture thereof. The crystalline carbon may be non-shaped, or sheet, flake, spherical, or fiber shaped natural graphite or artificial graphite. The amorphous carbon may be a soft carbon, a hard carbon, a mesophase pitch carbonization product, calcined coke, or the like.

The lithium metal alloy may include an alloy of lithium and, e.g., Na, K, Rb, Cs, Fr, Be, Mg, Ca, Sr, Si, Sb, Pb, In, Zn, Ba, Ra, Ge, Al, or Sn.

The material being capable of doping/dedoping lithium may be Si, a Si—C composite, $SiO_x$ (0<x<2), a Si-Q alloy (wherein Q is an alkali metal, an alkaline-earth metal, a Group 13 element, a Group 14 element, a Group 15 element, a Group 16 element, a transition metal, a rare earth element, or a combination thereof, and not Si), Sn, $SnO_2$, a Sn—R alloy (wherein R is an alkali metal, an alkaline-earth metal, a Group 13 element, a Group 14 element, a Group 15 element, a Group 16 element, a transition metal, a rare earth element, or a combination thereof, and not Sn), and the like. At least one of these materials may be mixed with $SiO_2$.

The elements Q and R may be selected from Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Tl, Ge, P, As, Sb, Bi, S, Se, Te, Po, and a combination thereof.

The transition metal oxide may include vanadium oxide, lithium vanadium oxide, or lithium titanium oxide.

In an implementation, the negative active material may be a Si—C composite including a Si active material and a carbon active material.

In the Si—C composite, an average particle diameter of the Si active material may be about 50 nm to about 200 nm.

When the average particle diameter of the Si active material is within the above range, volume expansion occurring during charging and discharging may be suppressed, and a break in a conductive path due to particle crushing during charging and discharging may be prevented.

The Si active material may be included in an amount of about 1 wt % to about 60 wt %, e.g., about 3 wt % to about 60 wt %, based on the total weight of the Si—C composite.

In an implementation, the negative active material may further include crystalline carbon together with the aforementioned Si—C composite.

When the negative active material includes a Si—C composite and crystalline carbon together, the Si—C composite and crystalline carbon may be included in the form of a mixture, and in this case, the Si—C composite and crystalline carbon may be included in a weight ratio of about 1:99 to about 50:50. In an implementation, the Si—C composite and crystalline carbon may be included in a weight ratio of about 5:95 to about 20:80.

The crystalline carbon may include graphite, e.g., natural graphite, artificial graphite, or a mixture thereof.

The average particle diameter of the crystalline carbon may be about 5 μm to about 30 μm.

In the present specification, the average particle diameter may be a particle size (D50) at 50% by volume in a cumulative size-distribution curve.

The Si—C composite may further include a shell surrounding the surface of the Si—C composite, and the shell may include amorphous carbon.

The amorphous carbon may include soft carbon, hard carbon, a mesophase pitch carbonized product, calcined coke, or a mixture thereof.

The amorphous carbon may be included in an amount of about 1 to about 50 parts by weight, e.g., about 5 to about 50 parts by weight, or about 10 to about 50 parts by weight, based on 100 parts by weight of the carbon active material.

In the negative active material layer, the negative active material may be included in an amount of about 95 wt % to about 99 wt %, based on the total weight of the negative active material layer.

In an implementation, the negative active material layer may include a binder, and optionally a conductive material. In the negative active material layer, a content of the binder may be about 1 wt % to about 5 wt %, based on the total weight of the negative active material layer. When the negative active material layer includes a conductive material, the negative active material layer includes about 90 wt % to about 98 wt % of the negative active material, about 1 wt % to about 5 wt % of the binder, and about 1 wt % to about 5 wt % of the conductive material.

The binder may help improve binding properties of negative active material particles with one another and with a current collector. The binder may include a non-water-soluble binder, a water-soluble binder, or a combination thereof.

The non-water-soluble binder may include polyvinylchloride, carboxylated polyvinylchloride, polyvinylfluoride, polyurethane, polytetrafluoroethylene, polyvinylidene fluoride, polyethylene, polypropylene, polyamideimide, polyimide, or a combination thereof.

The water-soluble binder may be a rubber binder or a polymer resin binder. The rubber binder may include a styrene-butadiene rubber, an acrylated styrene-butadiene rubber (SBR), an acrylonitrile-butadiene rubber, an acrylic rubber, a butyl rubber, a fluorine rubber, and a combination thereof. The polymer resin binder may include polytetrafluoroethylene, ethylenepropylenecopolymer, polyethyleneoxide, polyvinylpyrrolidone, polyepichlorohydrine, polyphosphazene, polyacrylonitrile, polystyrene, an ethylenepropylenediene copolymer, polyvinylpyridine, chlorosulfonated polyethylene, latex, a polyester resin, an acrylic resin, a phenolic resin, an epoxy resin, polyvinyl alcohol, or a combination thereof.

When the water-soluble binder is used as a negative electrode binder, a cellulose compound may be further included to provide viscosity as a thickener. The cellulose compound may include, e.g., carboxymethyl cellulose, hydroxypropylmethyl cellulose, methyl cellulose, or alkali metal salts thereof. The alkali metals may include Na, K, or Li. Such a thickener may be included in an amount of about 0.1 to about 3 parts by weight based on 100 parts by weight of the negative active material.

The conductive material may provide electrode conductivity. A suitable electrically conductive material may be used as a conductive material unless it causes a chemical change. Examples of the conductive material may include a carbon material such as natural graphite, artificial graphite, carbon black, acetylene black, Ketjen black, a carbon fiber, and the like; a metal material of a metal powder or a metal fiber including copper, nickel, aluminum, silver, and the like; a conductive polymer such as a polyphenylene derivative; or a mixture thereof.

The negative current collector may be selected from a copper foil, a nickel foil, a stainless steel foil, a titanium foil, a nickel foam, a copper foam, a polymer substrate coated with a conductive metal, and a combination thereof.

The rechargeable lithium battery may further include a separator between the negative electrode and the positive electrode, depending on a type of the rechargeable lithium battery. Such a separator may be a porous substrate; or a composite porous substrate.

The porous substrate is a substrate including pores and lithium ions may move through the pores. The porous substrate may include, e.g., polyethylene, polypropylene, polyvinylidene fluoride, and multi-layers thereof such as a polyethylene/polypropylene double-layered separator, a polyethylene/polypropylene/polyethylene triple-layered separator, or a polypropylene/polyethylene/polypropylene triple-layered separator.

The composite porous substrate may have a form including a porous substrate and a functional layer on the porous substrate. The functional layer may be, e.g., a heat-resistant layer and an adhesive layer from the viewpoint of enabling additional functions to be added. In an implementation, the heat-resistant layer may include a heat-resistant resin and optionally a filler.

In an implementation, the adhesive layer may include an adhesive resin and optionally a filler.

The filler may be an organic filler or an inorganic filler.

Referring to FIG. 1, a rechargeable lithium battery 100 according to an embodiment may include a battery cell including a negative electrode 112, a positive electrode 114 facing the negative electrode 112, a separator 113 between the negative electrode 112 and the positive electrode 114, and an electrolyte (not shown) impregnating the negative electrode 112, the positive electrode 114, and the separator 113, a battery case 120 housing the battery cell, and a sealing member 140 for sealing the battery case 120.

The following Examples and Comparative Examples are provided in order to highlight characteristics of one or more embodiments, but it will be understood that the Examples and Comparative Examples are not to be construed as limiting the scope of the embodiments, nor are the Comparative Examples to be construed as being outside the scope of the embodiments. Further, it will be understood that the embodiments are not limited to the particular details described in the Examples and Comparative Examples.

SYNTHESIS OF ADDITIVES

Synthesis Example 1: Compound of Chemical Formula a-1

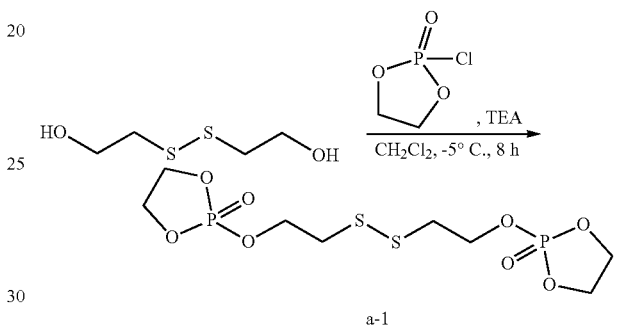

After setting a temperature at −5° C., bis(2-hydroxyethyl) disulfide (6.8 g, 0.04 mol) and triethylamine (TEA, 8.9 g, 0.09 mol) were put in a 50 mL dried dichloromethane under a nitrogen atmosphere. This mixed solution was slowly added in a dropwise fashion to 100 mL of a dried dichloromethane solution in which 2-chloro-2-oxo-1,3,2-dioxaphospholane (COP, 12.54 g, 0.088 mol) was dissolved. After stirring the mixture for 8 hours, a salt produced therein was filtered and removed, and a filtrate therefrom was dried. Subsequently, 50 mL of toluene was added to the dried mixture to obtain a white solid produced therein (12.9 g, 88%); $^1$H NMR (400 MHz, CDCl$_3$): δ 4.40 (m, 12H), 3.01 (m, 4H); $^{31}$P NMR: δ 17.98

Synthesis Example 2: Compound of Chemical Formula a-2

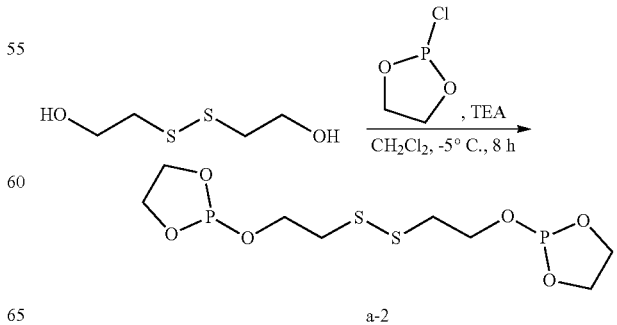

After setting a temperature at −5° C., bis(2-hydroxyethyl) disulfide (6.8 g, 0.04 mol) and triethylamine (8.9 g, 0.09 mol) were added to 50 mL of dried dichloromethane under a nitrogen atmosphere. This mixed solution was slowly added in a dropwise fashion to 100 mL of a dried dichloromethane solution in which 2-chloro-1,3,2-dioxaphospholane (11.1 g, 0.09 mol) was dissolved. After stirring the mixture for 8 hours, a salt produced therein was filtered and removed, and a filtrate therefrom was dried. Subsequently, 50 mL of diethyl ether was added to the dried mixture to remove a salt produced therein, and a filtrate therefrom was dried to obtain transparent oil. (10.7 g, 80%); $^1$H NMR (400 MHz, CDCl$_3$): δ 4.24 (m, 4H), 3.98 (m, 8H), 2.81 (m, 4H); $^{31}$P NMR: δ 137.11

Synthesis Example 3: Compound of Chemical Formula b-1

A compound represented by Chemical Formula b-1 was synthesized as described in Chinese Patent Reference CN111217856.

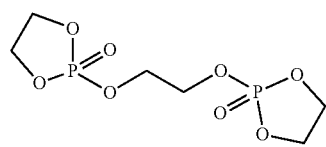

b-1

Synthesis Example 4: Compound of Chemical Formula b-2

A compound represented by Chemical Formula b-2 was synthesized as described in [Heteroatom chemistry 2010, 21, 515-520].

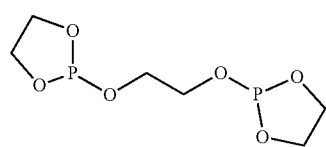

b-2

Manufacture of Rechargeable Lithium Battery Cell

Example 1

Positive active material slurry was prepared by using LiNi$_{0.91}$Co$_{0.07}$Al$_{0.02}$O$_2$ as a positive active material, polyvinylidene fluoride as a binder, and Ketjen black as a conductive material in a weight ratio of 97:2:1 and dispersing the resultant mixture in N-methyl pyrrolidone.

The positive active material slurry was coated on a 14 μm-thick Al foil, dried at 110° C., and pressed to manufacture a positive electrode.

A negative active material was prepared by mixing graphite and an Si—C composite in a weight ratio of 93:7, and then, the negative active material, a styrene-butadiene rubber binder, and carboxylmethyl cellulose were mixed in a weight ratio of 97:1:2 and then, dispersed in distilled water to prepare negative active material slurry.

The Si—C composite had a core including artificial graphite and silicon particles and coated with mesophase pitch carbonization product on the surface, wherein a content of the silicon was about 3 wt % based on the total weight of the Si—C composite.

The negative active material slurry was coated on a 10 μm-thick Cu foil, dried at 100° C., and pressed to manufacture a negative electrode.

An electrode assembly was manufactured by assembling the manufactured positive and negative electrodes, and a separator made of polyethylene having a thickness of 25 μm, and an electrolyte was injected to prepare a rechargeable lithium battery cell.

The electrolyte has a following composition.
(Electrolyte Composition)
  Salt: LiPF$_6$ 1.5 M
  Solvent: ethylene carbonate: ethylmethyl carbonate: dimethyl carbonate (EC:EMC:DMC=a volume ratio of 20:10:70)
  Additive: 1.0 wt % of the compound of Chemical Formula a-1 according to Synthesis Example 1
  (Herein, in the electrolyte composition, "wt %" is based on the total weight of the electrolyte (a lithium salt+a non-aqueous organic solvent+an additive))

Example 2

A rechargeable lithium battery cell was manufactured according to the same method as Example 1 except that the compound of Chemical Formula a-1 was used in an amount of 2.0 wt %.

Example 3

A rechargeable lithium battery cell was manufactured according to the same method as Example 1 except that the compound of Chemical Formula a-1 was used in an amount of 0.5 wt %.

Example 4

A rechargeable lithium battery cell was manufactured according to the same method as Example 1 except that the compound of Chemical Formula a-1 was used in an amount of 0.4 wt %.

Example 5

A rechargeable lithium battery cell was manufactured according to the same method as Example 1 except that the compound of Chemical Formula a-2 according to Synthesis Example 2 was used in an amount of 0.5 wt %.

Example 6

A rechargeable lithium battery cell was manufactured according to the same method as Example 1 except that the compound of Chemical Formula a-2 was used in an amount of 1.0 wt %.

Example 7

A rechargeable lithium battery cell was manufactured according to the same method as Example 1 except that the compound of Chemical Formula a-2 was used in an amount of 2.0 wt %.

Comparative Example 1

A rechargeable lithium battery cell was manufactured according to the same method as Example 1 except that an electrolyte to which an additive was not added was used.

Comparative Example 2

A rechargeable lithium battery cell was manufactured according to the same method as Example 1 except that the compound of Chemical Formula b-1 according to Synthesis Example 3 was used in an amount of 1.0 wt %.

Comparative Example 3

A rechargeable lithium battery cell was manufactured according to the same method as Example 1 except that the compound of Chemical Formula b-2 according to Synthesis Example 4 was used in an amount of 1.0 wt %.

Evaluation 1: DSC Measurement

The electrolytes according to Example 2 and Comparative Example 1 were analyzed in a differential scanning calorimeter (DSC) method, and the results are shown in Table 1.

TABLE 1

|  | Onset temperature (° C.) |
| --- | --- |
| Comparative Example 1 | 210 |
| Example 2 | 230 |

Referring to Table 1, an onset temperature of the electrolyte according to Example 2 was increased, compared with an electrolyte according to Comparative Example 1. In other words, when an electrolyte containing an additive according to an embodiment of the present disclosure was used, thermal characteristics were improved, and accordingly, high temperature safety and reliability of a rechargeable lithium battery are expected to be improved.

Evaluation 2: Measuring Operation Time of CID

The rechargeable lithium battery cells of Examples 1, 2, and 4 and Comparative Example 1 were charged at a charge and discharge rate of 0.5 C in a mode of 4.35 V CC/CV for 3 hours and then, left in a 90° C. chamber for 90 hours to measure operation time of CID (Current Interrupt Device).

The CID (Current Interrupt Device) is a device detecting a pressure change, that is, a pressure increase in the closed and sealed device and cutting off a current by itself, when the pressure exceeds a certain pressure.

Figure 2:
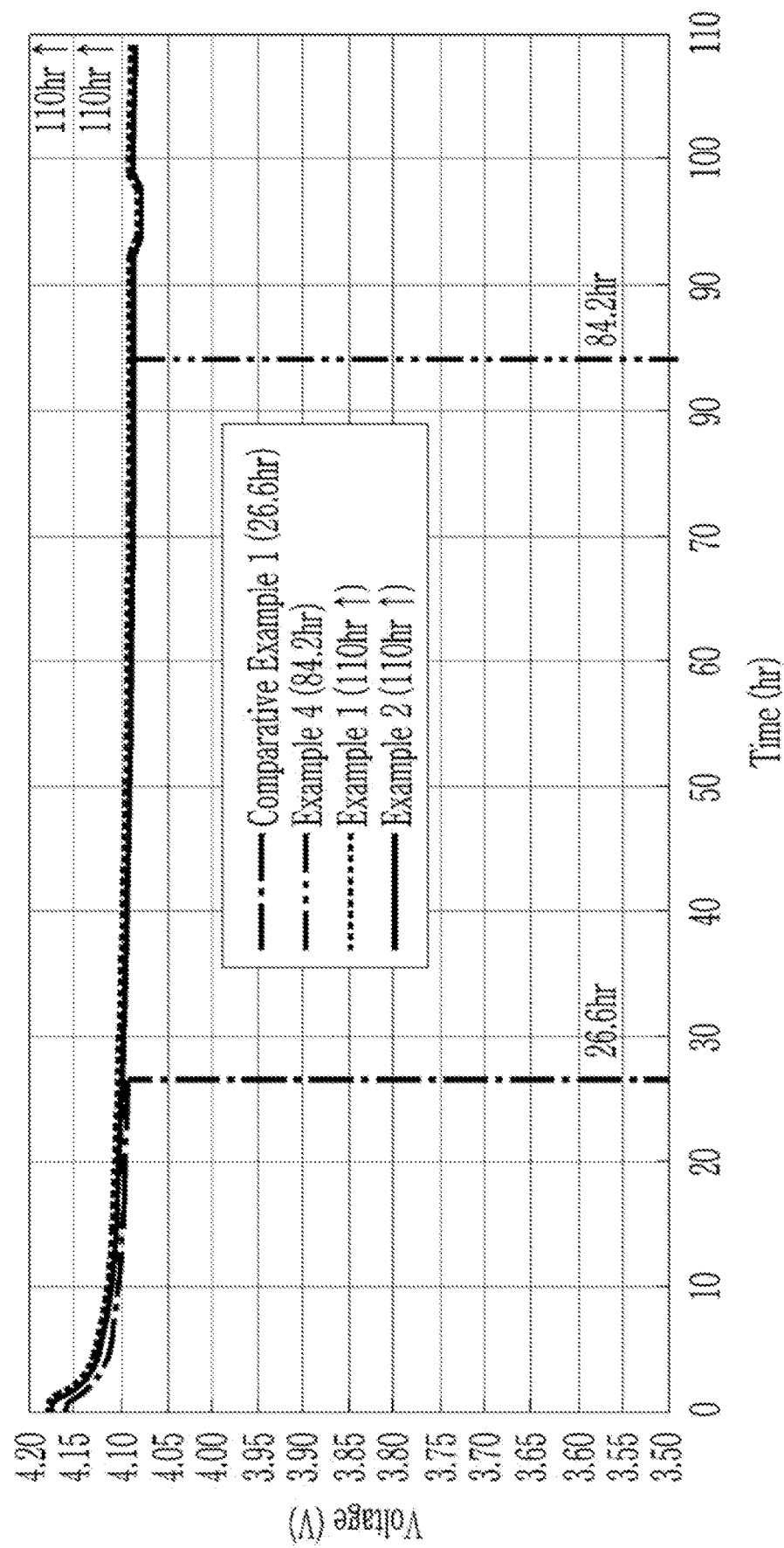
FIG. 2 is a graph showing an operation time of a CID (Current Interrupt Device) of a rechargeable lithium battery cells according to Examples 1, 2, and 4 and Comparative Example 1.

The results are shown in FIG. 2.

FIG. 2 is a graph showing operation time of CID (Current Interrupt Device) of the rechargeable lithium battery cells according to Examples 1, 2 and 4 and Comparative Example 1.

The CID operation time was measured to evaluate storage characteristics at a high temperature of the rechargeable lithium battery cells.

Referring to FIG. 2, Comparative Example 1 exhibited a sharp voltage drop before about 30 hour when stored at a high temperature of 90° C., and the Examples including an additive according to an embodiment of the present disclosure exhibited a voltage drop after at least 80 hours, and thus an effect of delaying an open circuit voltage (OCV) drop by delaying decomposition of the electrolyte and thus suppressing a resistance increase. In other words, gas generation in the rechargeable lithium battery cells according to the Examples was suppressed, even when stored at a high temperature.

Evaluation 3: Evaluation of Internal Resistance Characteristics when Left at High Temperature The rechargeable lithium battery cells according to Examples 1 to 3 and 5 to 7 and Comparative Examples 1 to 3 were left at 60° C. for 30 days in a state of charge (=100%, SOC) to evaluate an internal resistance increase rate, when stored at a high temperature of 60° C., and the results are shown in Table 2 and FIG. 3.

Direct current-Internal Resistance (DC-IR) was measured in the following method.

The cells according to Examples 1 to 3 and 5 to 7 and Comparative Examples 1 to 3 were charged at 4 A and 4.2 V and cut off at 100 mA at room temperature of 25° C. and then, paused for 30 minutes. Subsequently, the cells were respectively discharged at 10 A for 10 seconds, at 1 A for 10 seconds, and at 10 A for 4 seconds and then, measured with respect to a current and a voltage at 18 seconds and 23 seconds to calculate initial resistance (a difference between resistance at the 18 seconds and resistance at the 23 seconds) according to an equation of $\Delta R = \Delta V / \Delta I$.

The cells were charged under a condition of 0.2 C and 4.2 V and left at 60° C. for 30 days to measure DC-IR, which was used to calculate a resistance increase rate (ADC-IR) before and after being left. Herein, the resistance increase rate (%) is a percentage of DC-IR after being left for 30 days relative to initial DC-IR.

TABLE 2

|  | Initial DC-IR (mΩ) | DC-IR (mΩ) 60° C. @30 days | ΔDC-IR (%) |
| --- | --- | --- | --- |
| Comparative Example 1 | 19.33 | 26.75 | 138.4 |
| Comparative Example 2 | 19.23 | 26.95 | 140.1 |
| Comparative Example 3 | 19.35 | 27.01 | 139.6 |
| Example 1 | 19.11 | 25.74 | 134.7 |
| Example 2 | 19.61 | 26.67 | 136.0 |
| Example 3 | 19.10 | 25.90 | 135.6 |
| Example 5 | 19.23 | 26.21 | 136.3 |
| Example 6 | 19.07 | 25.77 | 135.1 |
| Example 7 | 19.55 | 26.71 | 136.6 |

Figure 3:
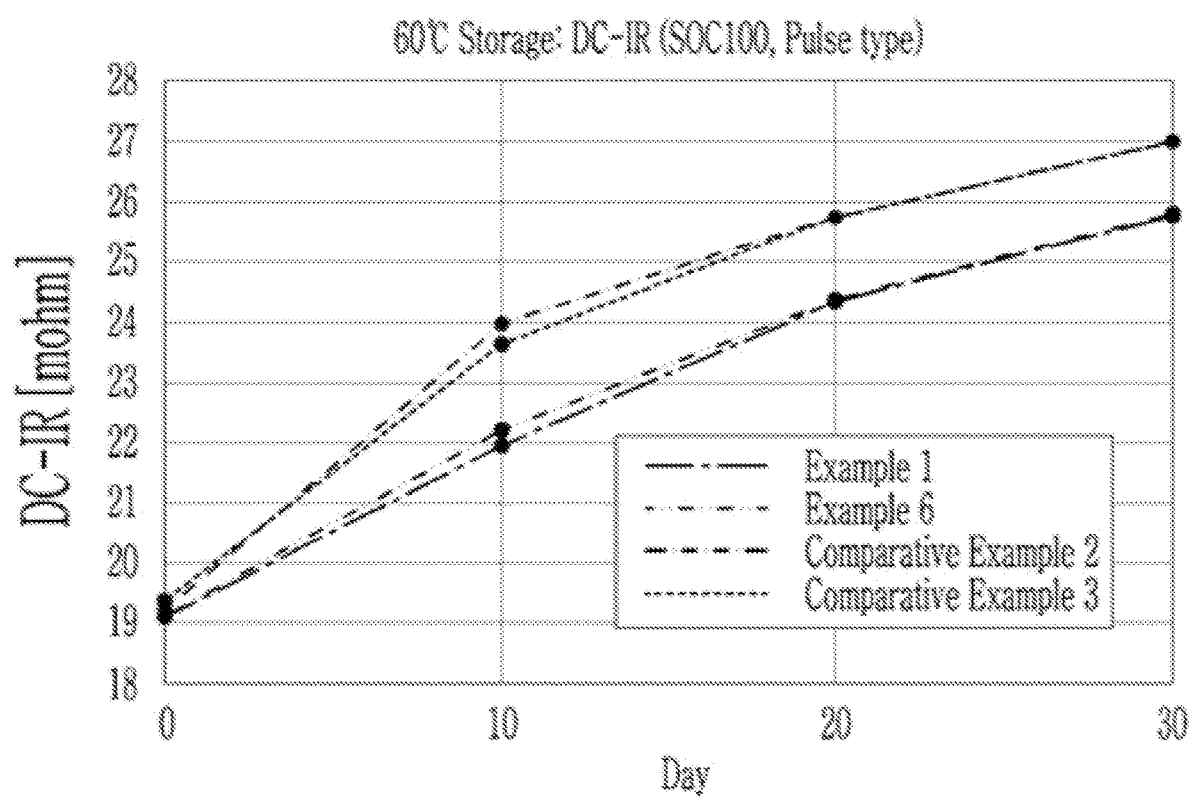
FIG. 3 is a graph showing a resistance increase rate after measuring DC-internal resistance after leaving the rechargeable lithium battery cells according to Examples 1 and 6 and Comparative Examples 2 and 3 at 60° C. for 30 days.

FIG. 3 is a graph showing a resistance increase rate after measuring DC-internal resistance after leaving the rechargeable lithium battery cells according to Examples 1 and 6 and Comparative Examples 2 and 3 at 60° C. for 30 days.

Referring to Table 2 and FIG. 3, resistance increase rates of the rechargeable lithium battery cells of Examples 1 to 3 and 5 to 7 before and after being left at a high temperature decreased, compared with those of the cells of Comparative Examples 1 to 3. Accordingly, the secondary battery cells according to Examples 1 to 3 and 5 to 7 exhibited improved high temperature stability, compared with the cells according to Comparative Examples 1 to 3.

By way of summation and review, an electrolyte may include an organic solvent in which a lithium salt is dissolved, and such an electrolyte may determine stability and performance of a rechargeable lithium battery.

$LiPF_6$ (that is most commonly used as a lithium salt of an electrolyte) may react with an organic solvent of an electrolyte to promote depletion of a solvent and generate a large amount of gas. When $LiPF_6$ is decomposed, it generates LiF and $PF_5$, which leads to electrolyte depletion in the battery, resulting in degradation in high temperature performance and poor safety.

Accordingly, an electrolyte may have improved safety without deteriorating performance even under high temperature conditions.

One or more embodiments may provide an additive with improved thermal stability.

One or more embodiments may provide a rechargeable lithium battery including the additive which has improved high-temperature cycle-life characteristics and high-temperature storage characteristics by improving high-temperature safety and high-temperature reliability, and reducing a voltage drop and resistance increase rate during high-temperature storage.

By applying an additive with improved thermal safety, a rechargeable lithium battery having improved high temperature characteristics may be implemented by suppressing an increase in internal resistance of the battery and suppressing a voltage drop after being left at a high temperature.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. An electrolyte for a rechargeable lithium battery, the electrolyte comprising:
   a non-aqueous organic solvent,
   a lithium salt, and
   an additive represented by Chemical Formula 1 or Chemical Formula 2:

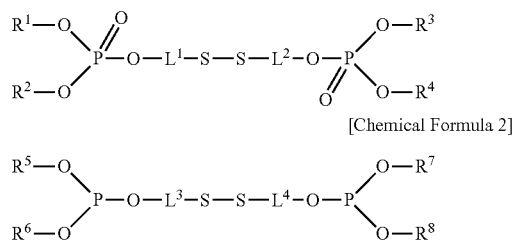

[Chemical Formula 1]

[Chemical Formula 2]

wherein, in Chemical Formula 1 and Chemical Formula 2, $R^1$ to $R^8$ are each independently an unsubstituted C1 to C10 alkyl group, an unsubstituted C2 to C10 alkenyl group, an unsubstituted C3 to C10 cycloalkyl group, an unsubstituted C3 to C10 cycloalkenyl group, an unsubstituted C2 to C10 alkynyl group, an unsubstituted C3 to C10 cycloalkynyl group, or an unsubstituted C6 to C20 aryl group, $R^1$ to $R^8$ are separately present, or at least one pair of $R^1$ and $R^2$; $R^3$ and $R^4$; $R^5$ and $R^6$; and $R^7$ and $R^8$ are linked to each other to provide an unsubstituted monocyclic aliphatic heterocycle, an unsubstituted polycyclic aliphatic heterocycle, an unsubstituted monocyclic aromatic heterocycle, or an unsubstituted polycyclic aromatic heterocycle, and $L^1$ to $L^4$ are each independently an unsubstituted C1 to C20 alkylene group.

2. The electrolyte as claimed in claim 1, wherein:
the additive is represented by Chemical Formula 1,
Chemical Formula 1 is represented by Chemical Formula 1A or Chemical Formula 1B:

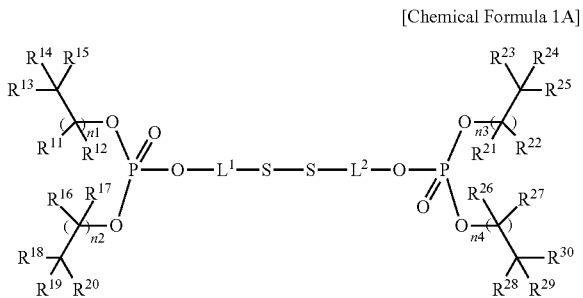

[Chemical Formula 1A]

in Chemical Formula 1A,
$R^{11}$ to $R^{30}$ are each independently hydrogen, a halogen, or an unsubstituted C1 to C10 alkyl group,
n1 to n4 are each independently an integer of 0 to 4, and
$L^1$ and $L^2$ are each independently an unsubstituted C1 to C20 alkylene group;

[Chemical Formula 1B]

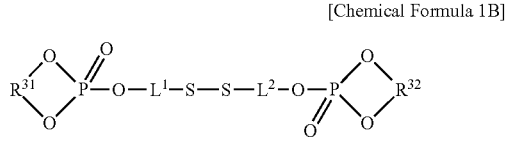

in Chemical Formula 1B,
$R^{31}$ and $R^{32}$ are each independently an unsubstituted C2 to C10 alkylene group, and
$L^1$ and $L^2$ are each independently an unsubstituted C1 to C20 alkylene group.

3. The electrolyte as claimed in claim 2, wherein:
the additive is represented by Chemical Formula 1B,
Chemical Formula 1B is represented by Chemical Formula 1B-I or Chemical Formula 1B-II:

[Chemical Formula 1B-I]

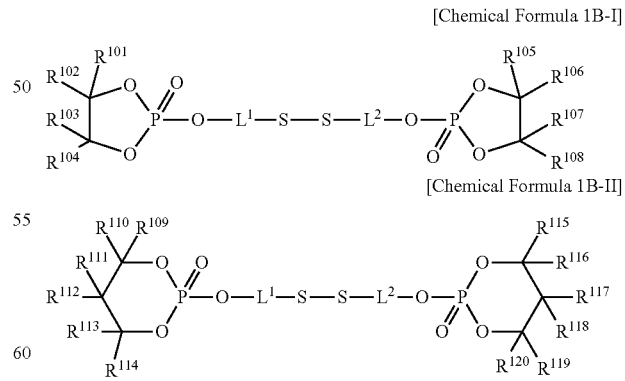

[Chemical Formula 1B-II]

in Chemical Formula 1B-I and Chemical Formula 1B-II,
$R^{101}$ to $R^{120}$ are each independently hydrogen, a halogen, or an unsubstituted C1 to C10 alkyl group, and
$L^1$ and $L^2$ are each independently an unsubstituted C1 to C20 alkylene group.

4. The electrolyte as claimed in claim 1, wherein:
the additive is represented by Chemical Formula 2, Chemical Formula 2 is represented by Chemical Formula 2A or Chemical Formula 2B:

[Chemical Formula 2A]

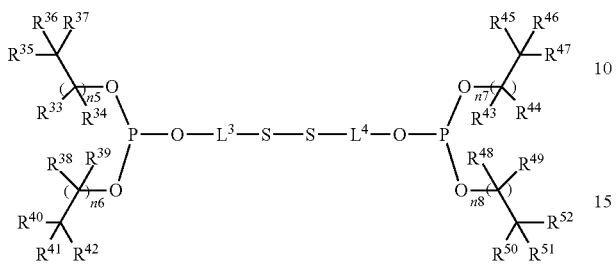

in Chemical Formula 2A,
$R^{33}$ to $R^{52}$ are each independently hydrogen, a halogen, or an unsubstituted C1 to C10 alkyl group,
n5 to n8 are each independently an integer of 0 to 4, and
$L^3$ and $L^4$ are each independently an unsubstituted C1 to C20 alkylene group;

[Chemical Formula 2B]

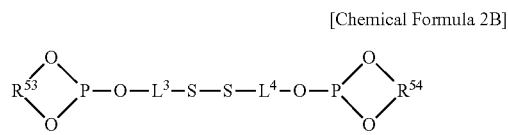

in Chemical Formula 2B,
$R^{53}$ and $R^{54}$ are each independently an unsubstituted C2 to C10 alkylene group, and
$L^3$ and $L^4$ are each independently an unsubstituted C1 to C20 alkylene group.

5. The electrolyte as claimed in claim 4, wherein:
the additive is represented by Chemical Formula 2B, Chemical Formula 2B is represented by Chemical Formula 2B-I or Chemical Formula 2B-II:

[Chemical Formula 2B-I]

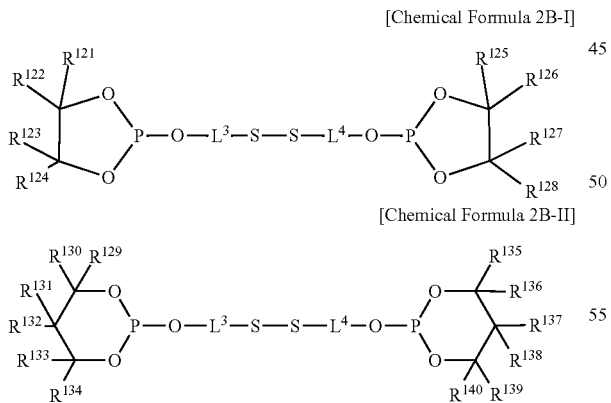

[Chemical Formula 2B-II]

wherein, in Chemical Formula 2B-I and Chemical Formula 2B-II,
$R^{121}$ to $R^{140}$ are each independently hydrogen, a halogen, or an unsubstituted C1 to C10 alkyl group, and $L^3$ and $L^4$ are each independently an unsubstituted C1 to C20 alkylene group.

6. The electrolyte as claimed in claim 1, wherein:
the additive is represented by Chemical Formula 1B-I-1 or Chemical Formula 2B-I-1:

[Chemical Formula 1B-I-1]

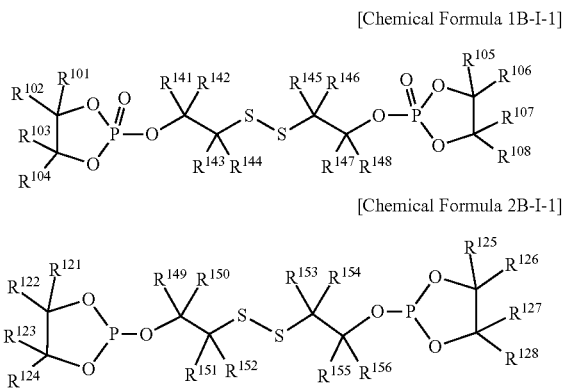

[Chemical Formula 2B-I-1]

in Chemical Formula 1B-I-1 and Chemical Formula 2B-I-1, $R^{101}$ to $R^{108}$, $R^{121}$ to $R^{128}$, and $R^{141}$ to $R^{156}$ are each independently hydrogen, a halogen, or an unsubstituted C1 to C10 alkyl group.

7. The electrolyte as claimed in claim 1, wherein the additive is included in an amount of about 0.1 wt % to about 10 wt %, based on a total weight of the electrolyte for a rechargeable lithium battery.

8. A rechargeable lithium battery, comprising:
a positive electrode including a positive active material;
a negative electrode including a negative active material; and
the electrolyte as claimed in claim 1.

9. The rechargeable lithium battery as claimed in claim 8, wherein:
the positive active material is represented by Chemical Formula 5:

$$Li_xM^1_{1-y-z}M^2_yM^3_zO_2 \qquad \text{[Chemical Formula 5]}$$

in Chemical Formula 5,
$0.5 \leq x \leq 1.8$, $0 \leq y \leq 1$, $0 \leq z \leq 1$, $0 \leq y+z < 1$, and $M^1$, $M^2$, and $M^3$ are each independently Ni, Co, Mn, Al, Sr, Mg, La, or a combination thereof.

10. The rechargeable lithium battery as claimed in claim 8, wherein:
the positive active material is a lithium composite oxide represented by Chemical Formula 5-1, Chemical Formula 5-2, or Chemical Formula 5-3:

$$Li_{x1}Ni_{y1}Co_{z1}Al_{1-y1-z1}O_2 \qquad \text{[Chemical Formula 5-1]}$$

in Chemical Formula 5-1, $1 \leq x1 \leq 1.2$, $0 < y1 < 1$, and $0 < z1 < 1$, $$Li_{x2}Ni_{y2}Co_{z2}Mn_{1-y2-z2}O_2 \qquad \text{[Chemical Formula 5-2]}$$

in Chemical Formula 5-2, $1 \leq x2 \leq 1.2$, $0 < y2 < 1$, and $0 < z2 < 1$, $$Li_{x3}CoO_2 \qquad \text{[Chemical Formula 5-3]}$$

in Chemical Formula 5-3, $0.5 < x3 \leq 1$.

* * * * *